(12) United States Patent
Shimada et al.

(10) Patent No.: US 7,940,631 B2
(45) Date of Patent: May 10, 2011

(54) OPTICAL PICKUP DEVICE

(75) Inventors: Naoto Shimada, Hyogo (JP); Hiroaki Yamamoto, Hyogo (JP); Naoki Nakanishi, Shiga (JP); Masahiko Nishimoto, Osaka (JP); Takuya Okuda, Kyoto (JP)

(73) Assignee: Panasonic Corporation, Osaka (JP)

( * ) Notice: Subject to any disclaimer, the term of this patent is extended or adjusted under 35 U.S.C. 154(b) by 633 days.

(21) Appl. No.: 12/090,563

(22) PCT Filed: Jul. 18, 2007

(86) PCT No.: PCT/JP2007/064172
§ 371 (c)(1),
(2), (4) Date: Apr. 17, 2008

(87) PCT Pub. No.: WO2008/093439
PCT Pub. Date: Aug. 7, 2008

(65) Prior Publication Data
US 2010/0157778 A1 Jun. 24, 2010

(30) Foreign Application Priority Data

Feb. 1, 2007 (JP) .................................. 2007-022603

(51) Int. Cl.
*G11B 7/135* (2006.01)
(52) U.S. Cl. .......... 369/112.12; 369/112.03; 369/112.04; 369/112.05; 369/112.06; 369/112.07; 369/112.11
(58) Field of Classification Search .................. None
See application file for complete search history.

(56) References Cited

U.S. PATENT DOCUMENTS

2002/0163874 A1* 11/2002 Nakanishi et al. ....... 369/112.04
2004/0081064 A1 4/2004 Ohnishi et al.
(Continued)

FOREIGN PATENT DOCUMENTS

EP 2 096 636 A1 9/2009
(Continued)

OTHER PUBLICATIONS

Japanese Notice of Reasons for Rejections, w/ English translation thereof, issued in Japanese Patent Application No. JP 2007-022603 dated Jul. 21, 2009.

*Primary Examiner* — Joseph Haley
*Assistant Examiner* — Ifedayo Iluyomade
(74) *Attorney, Agent, or Firm* — McDermott Will & Emery LLP

(57) ABSTRACT

An optical pickup device includes a diffraction grating 12 for separating an emitted light beam into at least three light beams. The diffraction grating 12 is divided into three regions by dividing lines D1 and D2 extending in a first direction parallel to a tangent line of a track of an optical information recording medium. A second region 12B is divided into four sub-blocks by a dividing line D3 extending in the first direction and a dividing line D4 extending in a second direction that crosses the first direction. The sub-blocks located diagonally opposite to each other have a same phase, and the sub-blocks located adjacent to each other have a phase difference of approximately 180 degrees. The first region 12A has a phase difference of approximately 90 degrees from each sub-block of the second region 12B, and the first region 12A has a phase difference of approximately 180 degrees from the third region 12C.

16 Claims, 12 Drawing Sheets

U.S. PATENT DOCUMENTS

| | | |
|---|---|---|
| 2005/0276206 A1 | 12/2005 | Katayama |
| 2010/0177618 A1* | 7/2010 | Shimada et al. ......... 369/112.12 |

FOREIGN PATENT DOCUMENTS

| | | |
|---|---|---|
| JP | 61-094246 | 5/1986 |
| JP | 4-34212 | 6/1992 |
| JP | 2004-145915 | 5/2004 |
| JP | 2005-353187 | 12/2005 |
| JP | 2006-228304 | 8/2006 |
| JP | 2007-35193 | 2/2007 |
| JP | 2007-42252 | 2/2007 |
| JP | 2007-122779 | 5/2007 |
| JP | 2007-141425 | 6/2007 |
| JP | 2008-152853 | 7/2008 |
| JP | 2008-176899 | 7/2008 |

* cited by examiner

US 7,940,631 B2

OPTICAL PICKUP DEVICE

RELATED APPLICATIONS

This application is the U.S. National Phase under 35 U.S.C. §371 of International Application No. PCT/JP2007/064172, filed on Jul. 18, 2007, which in turn claims the benefit of Japanese Patent Application No. JP 2007-022603, filed on Feb. 1, 2007, the disclosures of which Applications are incorporated by reference herein.

TECHNICAL FIELD

The invention relates to an optical pickup device having a function to detect a playback/recording signal and various servo signals that are used in an optical head device serving as a main part of an optical information processor for performing processing, such as recording, playback, or erasure of information, on an optical information recording medium such as an optical disc.

BACKGROUND ART

Reading recorded information from an optical information recording medium (optical disc) such as a CD (Compact Disc) and a DVD (Digital Versatile Disc) is conducted by converging a light beam emitted from a light source such as a semiconductor laser device on a recording track of the optical disc by using an objective lens and converting reflected light from the optical disc to an electric signal by a photodetector. In order to accurately converge a light beam on a desired recording track of a rapidly spinning optical disc, a focus error signal and a tracking error signal are detected and the position of the objective lens is controlled according to surface displacement, eccentricity, and the like of the optical disc.

A differential push-pull (DPP) method is known as a typical method for detecting a tracking error signal. In the DPP method, a light beam is separated into three beams: a main beam; a $+1^{st}$ order diffracted beam; and a $-1^{st}$ order diffracted beam. These three beams are respectively converged on three adjacent guide grooves formed at a prescribed pitch on the optical disc. Push-pull signals respectively obtained by detecting reflected light of the $+1^{st}$ order diffracted beam and the $-1^{st}$ order diffracted beam and performing an arithmetic operation have a phase difference of 180 degrees from a push-pull signal obtained by detecting reflected light of the main beam and performing an arithmetic operation. Therefore, by performing arithmetic processing of each push-pull signal, only offset components included in the push-pull signals are selectively cancelled each other, whereby an excellent tracking error signal can be detected. Accordingly, the DDP method has been widely used especially in a DVD recording optical pickup (e.g., see Patent document 1).

There are various standards for currently used optical discs, and a guide groove pitch varies depending on the standards of the optical discs. For example, optical discs such as a write once type DVD-R (Recordable) and an erasable type DVD-RW (Disk ReWritable) have a guide groove pitch of 0.74 μm, and optical discs such as an erasable type DVD-RAM (Random Access Memory) has a guide groove pitch of 1.23 μm. An optical pickup device that enables recording and playback on two or more types of optical discs of different standards has been demanded. The following optical pickup device is proposed in view of this demand (e.g., see Patent document 2).

In the optical pickup device disclosed in Patent document 2, a special diffraction grating for separating a light beam is divided into three regions, and the phase of grating grooves periodically provided in each region is sequentially shifted by 90 degrees. A tracking error detection method using such a special diffraction grating is called an in-line DPP method, and the in-line DPP method enables stable tracking error detection on a plurality of optical information recording media having different guide groove pitches.

Patent document 1: Japanese Patent Publication for Opposition No. 4-34212

Patent document 2: Japanese Laid-Open Patent Publication No. 2004-145915

DISCLOSURE OF THE INVENTION

Problems to be Solved by the Invention

However, a conventional optical pickup device using the conventional in-line DPP method has the following problems.

FIG. 11 shows convergence spots of light beams that are converged on an optical information recording medium by a conventional optical pickup device. A convergence spot 101 corresponding to a $+1^{st}$ order diffracted beam has higher intensity on the right side in a radial direction X of the optical information recording medium and has lower intensity on the left side. On the other hand, a convergence spot 102 corresponding to a $-1^{st}$ order diffracted beam has lower intensity on the right side and has higher intensity on the left side. This can be explained as follows:

As shown in FIG. 12, in a special diffraction grating used in the conventional in-line DPP method, the phase of grating grooves 119a in a region 119 is ahead of that of grating grooves 120a in a central region 120 by 90 degrees, and the phase of grating grooves 121a in a region 121 is behind that of the grating grooves 120a in the central region 120 by 90 degrees. Accordingly, the phase of the $+1^{st}$ order diffracted beam that has passed through the region 119 is ahead of that of the $+1^{st}$ order diffracted beam that has passed through the central region 120 by 90 degrees, and the phase of the $+1^{st}$ order diffracted beam that has passed through the region 121 is behind that of the $+1^{st}$ order diffracted beam that has passed through the central region 120 by 90 degrees. The phase relation of the grating grooves and diffracted beams is opposite for the $-1^{st}$ order diffracted beam. In other words, the phase of the $-1^{st}$ order diffracted beam that has passed through the region 119 is behind that of the $-1^{st}$ order diffracted beam that has passed through the central region 120 by 90 degrees, and the phase of the $-1^{st}$ order diffracted beam that has passed through the region 121 is ahead of that of the $-1^{st}$ order diffracted beam that has passed through the central region 120 by 90 degrees.

Accordingly, the $+1^{st}$ order diffracted beam has larger intensity distribution on the side of the region 121 where the phase is retarded, and the convergence spot 101 corresponding to the $+1^{st}$ order diffracted beam on the optical information recording medium has higher intensity on the right side and lower intensity on the left side. On the other hand, the $-1^{st}$ order diffracted beam has larger intensity distribution on the side of the region 119 where the phase is retarded, and the convergence spot 102 corresponding to the $-1^{st}$ order diffracted beam has lower light intensity on the right side and higher intensity on the left side.

In the case where the convergence spot 101 corresponding to the $+1^{st}$ order diffracted beam and the convergence spot 102 corresponding to the $-1^{st}$ order diffracted beam have left-right asymmetric intensity distribution, the phase difference between a push-pull signal obtained by detecting reflected light from the convergence spot 100 corresponding to the main beam and each of push-pull signals respectively obtained by detecting reflected light from the convergence spots 101 and 102 is shifted from 180 degrees. Therefore, each convergence spot cannot be formed on the same guide groove, and stable tracking error signal detection by the in-line DPP method cannot be implemented.

The invention is made to solve the above problems and it is an object of the invention to implement an optical pickup device for conducting stable tracking error detection on a plurality of optical information recording media having different guide groove pitches while maintaining the advantages of the in-line DPP method.

Means for Solving the Problems

In order to achieve the above object, an optical pickup device of the invention includes a diffraction grating that is divided into three regions having different phases, and the region located in the middle is divided into a plurality of sub-blocks having different phases.

More specifically, a first optical pickup device according to the invention is an optical pickup device for recording information onto an optical information recording medium and reading and erasing information recorded on the optical information recording medium, and includes: a light source; a diffraction grating for separating a light beam emitted from the light source into at least three light beams; and a photodetector for receiving the separated light beams reflected from the optical information recording medium. The diffraction grating is divided into a first region, a second region, and a third region having periodic structures with different phases by a first dividing line and a second dividing line that extend in a first direction parallel to a tangential direction of a track of the optical information recording medium. The second region is located between the first region and the third region and is divided into a first sub-block, a second sub-block, a third sub-block, and a fourth sub-block by a third dividing line extending in the first direction and a fourth dividing line extending in a second direction that crosses the first direction. The first sub-block and the second sub-block are located adjacent to each other in the second direction, and the third sub-block and the fourth sub-block are located adjacent to each other in the second direction. The first sub-block and the third sub-block are located adjacent to each other in the first direction, and the second sub-block and the fourth sub-block are located adjacent to each other in the first direction. The respective periodic structures of the first sub-block and the fourth sub-block have a same phase and the respective periodic structures of the second sub-block and the third sub-block have a same phase. The periodic structures of the first sub-block and the fourth sub-block have a phase difference of approximately 180 degrees from the periodic structures of the second sub-block and the third sub-block. The periodic structure of the first region has a phase difference of approximately 90 degrees from the periodic structure of each sub-block of the second region. The periodic structure of the first region has a phase difference of approximately 180 degrees from the periodic structure of the third region.

In the first optical pickup device, the periodic structures of the first sub-block and the fourth sub-block have a phase difference of approximately 180 degrees from the periodic structures of the second sub-block and the third sub-block. Therefore, diffracted light that has passed through the first sub-block and the fourth sub-block and diffracted light that has passed through the second sub-block and the third sub-block cancel each other. Accordingly, respective convergence spots of sub-beams on a recording surface of the optical information recording medium have lower intensity in their centers. The periodic structure of the first region has a phase difference of approximately 90 degrees from the periodic structures of the first sub-block and the fourth sub-block, and has a phase difference of approximately 180 degrees from the periodic structure of the third region. Therefore, light whose phase is advanced by 90 degrees and light whose phase is retarded by 90 degrees are equally present on the left and right sides of the convergence spot with respect to the tangential direction of a track. Since intensity distribution of the convergence spots becomes left-right symmetric, a phase shift of push-pull signals respectively obtained by detecting reflected light beams from the convergence spots can be reduced. As a result, the convergence spots can be formed on the same guide groove, and an optical pickup for performing stable tracking error signal detection by an in-line DPP method can be implemented.

In the first optical pickup device, it is preferable that a gap between the first dividing line and the third dividing line is substantially equal to a gap between the second dividing line and the third dividing line.

In the first optical pickup device, it is preferable that the first sub-block, the second sub-block, the third sub-block, and the fourth sub-block have a substantially same area.

In the first optical pickup device, it is preferable that a center of the light beam emitted from the light source is positioned at an intersection of the third dividing line and the fourth dividing line in the diffraction grating. The light source may include a plurality of light sources, and a center of a light beam emitted from at least one of the plurality of light sources may be positioned at an intersection of the third dividing line and the fourth dividing line in the diffraction grating. The light source may include a first light source and a second light source, and a straight line connecting a center of a light beam emitted from the first light source and a center of a light beam emitted from the second light beam may cross the third dividing line.

A second optical pickup device according to the invention is an optical pickup device for recording information onto an optical information recording medium and reading and erasing information recorded on the optical information recording medium, and includes: a light source; a diffraction grating for separating a light beam emitted from the light source into at least three light beams; and a photodetector for receiving the separated light beams reflected from the optical information recording medium. The diffraction grating is divided into a first region, a second region, and a third region having periodic structures with different phases by a first dividing line and a second dividing line that extend in a first direction parallel to a tangential direction of a track of the optical information recording medium. The second region is located between the first region and the third region and is divided into at least two first sub-blocks and at least one second sub-block by at least two third dividing lines extending in the first direction. The first sub-block and the second sub-block are alternately arranged and the periodic structure of the first sub-block has a phase difference of approximately 180 degrees from the periodic structure of the second sub-block. The periodic structure of the first region has a phase difference of approximately 90 degrees from the periodic structure of each sub-block of the second region. The periodic structure of the first region has a phase difference of approximately 180 degrees from the periodic structure of the third region.

In the second optical pickup device, the second region is divided into at least two first sub-blocks and at least one second sub-block by at least two third dividing lines extending in the first direction. Therefore, the difference between the total area of the light beam passing through the at least two first sub-blocks and the total area of the light beam passing through the at least one second sub-block can be reduced, and the difference between the total light quantity of the light beam passing through the at least two first sub-blocks and the total light quantity of the light beam passing through the at least one second sub-block can be suppressed. Accordingly, excellent properties can be obtained regardless of the position of a center of the light beam emitted from the light source on the diffraction grating.

In the second optical pickup device, it is preferable that a length of the first sub-block in the second direction is substantially equal to a length of the second sub-block in the second direction.

In the second optical pickup device, it is preferable that a number of the first sub-blocks is equal to a number of the second sub-blocks.

In the second optical pickup device, it is preferable that a center of the light beam emitted from the light source is positioned in the second region of the diffraction grating. The light source may include a plurality of light sources, and a center of a light beam emitted from at least one of the plurality of light sources may be positioned in the second region of the diffraction grating. The light source may include a first light source and a second light source, a center of a light beam emitted from the first light source may be positioned in the first region of the diffraction grating or on the first dividing line, and a center of a light beam emitted from the second light source may be positioned in the third region of the diffraction grating or on the second dividing line.

In the first and second optical pickup devices, it is preferable that the at least three light beams include a $0^{th}$ order diffracted beam, a $+1^{st}$ order diffracted beam, and a $-1^{st}$ order diffracted beam.

In the first and second optical pickup devices, it is preferable that a plurality of guide grooves are periodically formed on a recording surface of the optical information recording medium and each of the separated light beams is converged on one of the plurality of guide grooves.

It is preferable that the first and second optical pickup devices further include an arithmetic processing circuit for detecting a tracking error signal by a differential push-pull method based on an output signal of the photodetector.

In the first and second optical pickup devices, it is preferable that the photodetector includes at least three light receiving elements respectively corresponding to the reflected light beams and each of the light receiving elements is divided into a plurality of light receiving regions.

EFFECTS OF THE INVENTION

The invention can thus implement an optical pickup device for conducting stable tracking error detection on a plurality of optical information recording media having different guide groove pitches while maintaining the advantages of the in-line DPP method.

Figure 1:
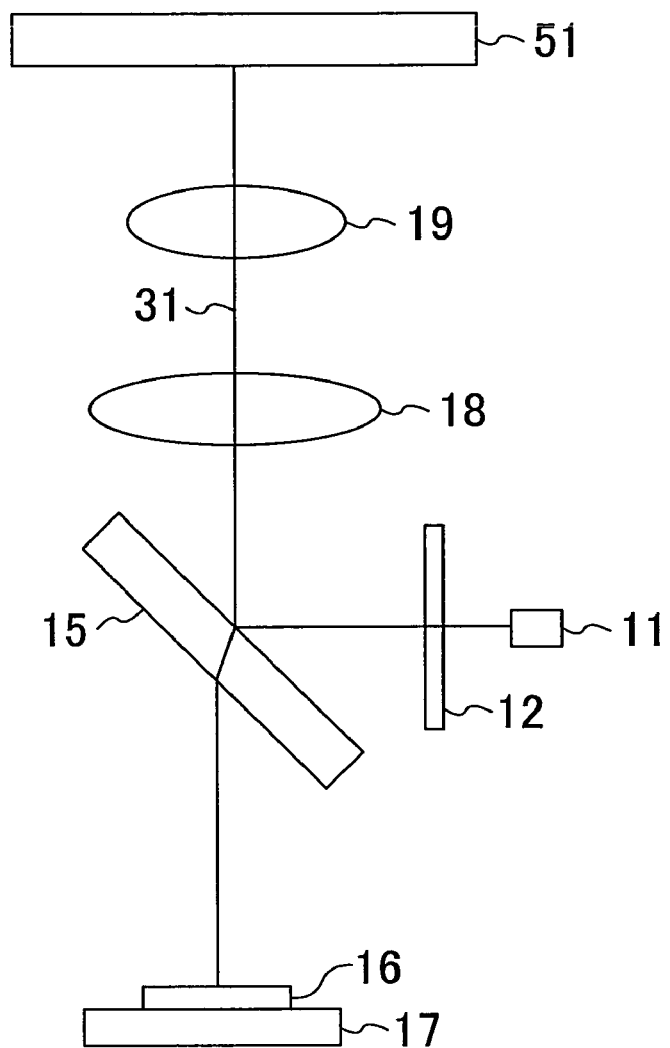
FIG. 1 is a block diagram of an optical pickup device according to a first embodiment of the invention.

DESCRIPTION OF THE REFERENCE NUMERALS 11 light source
12 diffraction grating
12A first region
12B second region
12C third region
12a grating groove
13A first sub-block
13B second sub-block
13C third sub-block
13D fourth sub-block
15 half mirror
16 photodetector
17 integrated circuit board
18 collimating lens
19 objective lens
21A light receiving element
21B light receiving element
21C light receiving element
23 arithmetic processing circuit
24 subtracter
25 subtracter
26 subtracter
27 adder
28 amplifier
29 subtracter
31 emitted light beam
31a main beam
31b sub-beam 31c sub-beam
51 optical information recording medium
51a guide groove

BEST MODE FOR CARRYING OUT THE INVENTION

First Embodiment

A first embodiment of the invention will be described with reference to the accompanying drawings. FIG. 1 schematically shows a structure of an optical pickup device according to the first embodiment.

As shown in FIG. 1, the optical pickup device of the first embodiment includes a light source 11, such as a semiconductor laser element, for emitting a light beam 31, a diffraction grating 12 for diffracting and separating the emitted light beam 31 into at least three light beams (not shown): a main beam that is a $0^{th}$ order diffracted beam, a sub-beam that is a $+1^{st}$ order diffracted beam, and a sub-beam that is a $-1^{st}$ order diffracted beam, a half mirror 15 for guiding the separated light beams to an optical information recording medium 51, and an integrated circuit board 17 having a photodetector 16 for receiving a light beam reflected from the optical information recording medium 51. Recording of information to the optical information recording medium 51 and playback of information recorded on the optical information recording medium 51 are conducted with this structure.

A collimating lens 18 and an objective lens 19 are placed between the half mirror 15 and the optical information recording medium 51. The light beam 31 emitted from the light source 11 is first diffracted and separated into at least three light beams: a $0^{th}$ order diffracted beam; a $+1^{st}$ order diffracted beam; and a $-1^{st}$ order diffracted beam by the diffraction grating 12. The diffracted beams thus separated are then reflected by the half mirror 15 and reach the objective lens 19 through the collimating lens 18. The $0^{th}$ order diffracted beam, the $+1^{st}$ order diffracted beam, and the $-1^{st}$ order diffracted beam thus obtained by the diffraction grating 1 are then independently converged on a recording surface of the optical information recording medium 51 by the objective lens 19 to form three convergence spots.

Figure 2:
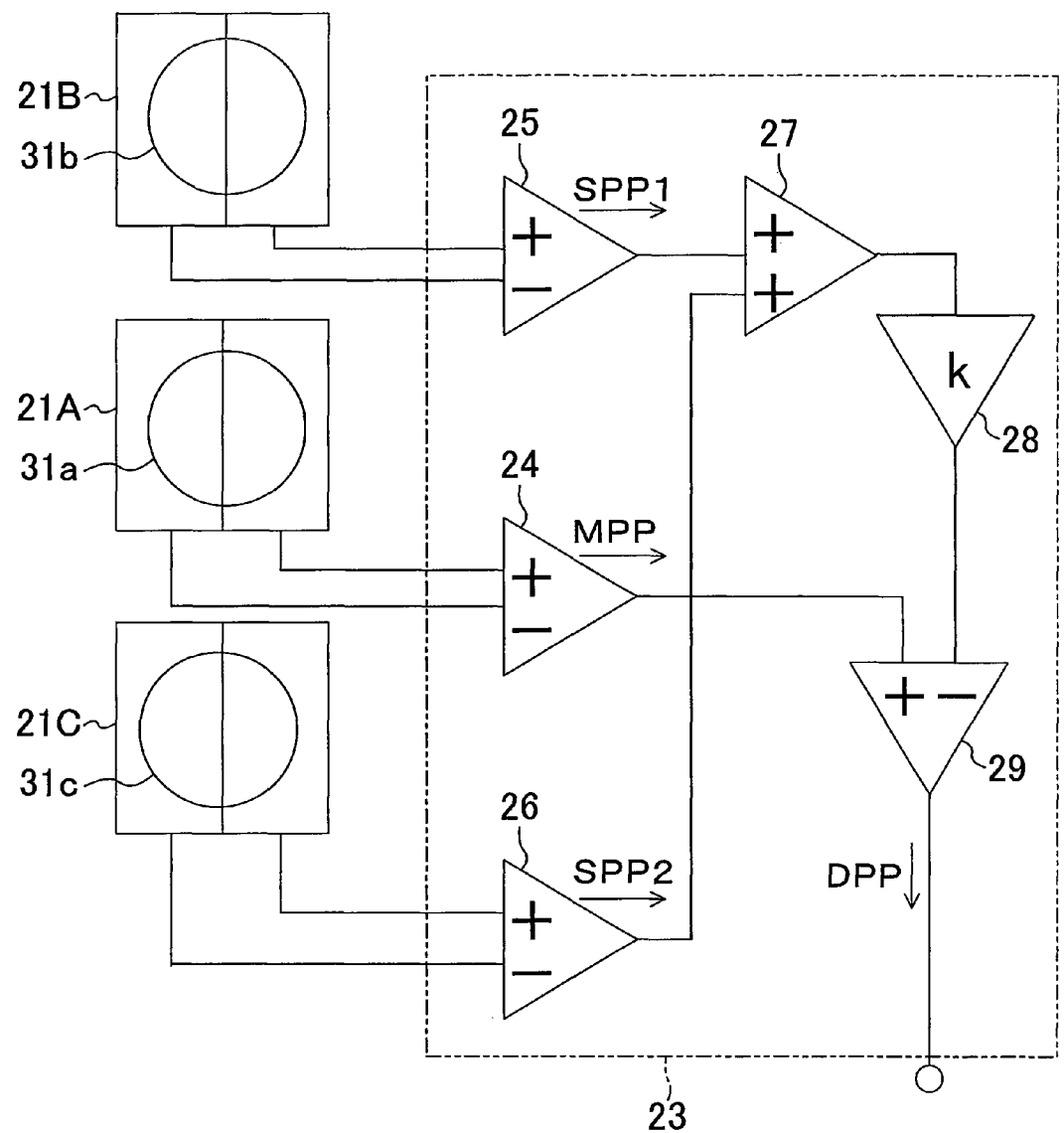
FIG. 2 is a circuit diagram of a photodetector of the optical pickup device according to the first embodiment of the invention.

FIG. 2 shows a circuit structure of the integrated circuit board 17 having the photodetector 16 in the optical pickup device of FIG. 1. As shown in FIG. 2, the integrated circuit board 17 has light receiving elements 21A, 21B, and 21C and an arithmetic processing circuit 23 for performing an arithmetic operation of signals from the light receiving elements. A main beam 31a and two sub-beams 31b and 31c separated from the emitted light beam 31 by the diffraction grating 12 are received by the light receiving elements 21A, 21B, and 21C, respectively. Each of the light receiving elements 21A, 21B, and 21C is divided into a plurality of light receiving regions.

Signals detected by the light receiving elements 21A, 21B, and 21C are applied to the arithmetic processing circuit 23. The arithmetic processing circuit 23 has subtracters 24, 25, and 26 for receiving signals from the light receiving elements 21A, 21B, and 21C, respectively, and an adder 27, an amplifier 28, and a subtracter 29 for receiving signals from the subtracters 24, 25, and 26. The subtracters 24, 25, and 26 receive signals from the light receiving elements 21A, 21B, and 21C and output push-pull signals MPP, SPP1, and SPP2, respectively. The adder 27, the amplifier 28, and the subtracter 29 of the arithmetic processing circuit 23 will be described later.

In the circuit structure of FIG. 2, each light receiving element is divided into two light receiving regions. However, each light receiving element may be divided into three or more light receiving regions. In FIG. 2, each beam in each light receiving element is schematically shown to have a circular shape. However, the beam shape is not limited to this.

Figure 3:
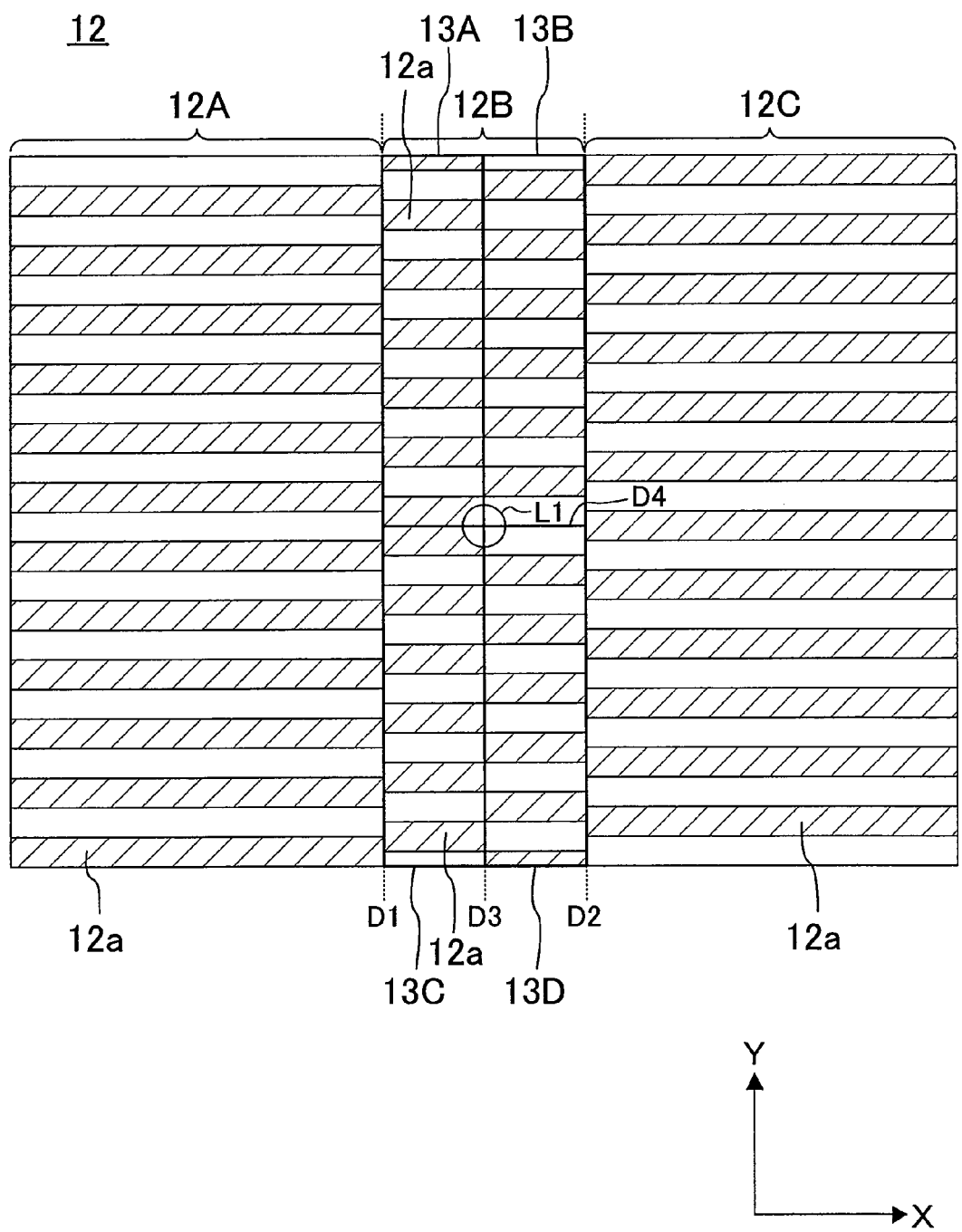
FIG. 3 is a plan view of a diffraction grating of the optical pickup device according to the first embodiment of the invention.

The optical pickup device of this embodiment is characterized in the diffraction grating 12 for diffracting the emitted light beam 31 and is characterized especially in a periodic structure of the diffraction grating 12. FIG. 3 shows a periodic structure, that is, a grating pattern, of the diffraction grating 12.

As shown in FIG. 3, a grating surface of the diffraction grating 12 is divided into three regions: a first region 12A; a second region 12B; and a third region 12C, by a first dividing line D1 and a second dividing line D2 that extend in an extending direction of guide grooves of the optical information recording medium 51 (hereinafter, referred to as Y direction), that is, in a direction substantially parallel to a tangential direction of a track of the optical information recording medium 51. In other words, the first region 12A and the second region 12B are adjacent to each other with the first dividing line D1 interposed therebetween, and the second region 12B and the third region 12C are adjacent to each other with the second dividing line D2 interposed therebetween. In this case, the parallel direction means a parallel direction in view of an optical system provided between the diffraction grating and the optical information recording medium.

The second region 12B is divided into four sub-blocks: a first sub-block 13A; a second sub-block 13B; a third sub-block 13C; and a fourth sub-block 13D, by a third dividing line D3 extending in Y direction and a fourth dividing line D4 extending in a direction crossing Y direction, that is, in a direction substantially parallel to a radius direction (hereinafter, referred to as X direction) of the optical information recording medium 51.

The respective lengths of the first sub-block 13A, the second sub-block 13B, the third sub-block 13C, and the fourth sub-block 13D in X direction are not specifically limited, but it is preferable that the first sub-block 13A, the second sub-block 13B, the third sub-block 13C, and the fourth sub-block 13D have the same length in X direction. The respective areas of the first sub-block 13A, the second sub-block 13B, the third sub-block 13C, and the fourth sub-block 13D are not specifically limited, but it is preferable that the first sub-block 13A, the second sub-block 13B, the third sub-block 13C, and the fourth sub-block 13D have the same area. In the case where the first through fourth sub-blocks 13A through 13D have the same area, an intersection of the third dividing line D3 and the fourth dividing line D4 is located substantially at the center of the second region 12B. Accordingly, in the case where the center of a light beam L1 emitted from the light source is positioned at the intersection of the third dividing line D3 and the fourth dividing line D4, the respective areas of light passing through the first region 12A and the second region 12B become equal to each other and the respective areas of light passing through the first through fourth sub-blocks 13A through 13D become equal to each other. As a result, convergence spots on the recording surface of the optical information recording medium 51 have an improved symmetric property.

In this case, the respective lengths of the first sub-block 13A, the second sub-block 13B, the third sub-block 13C, and the fourth sub-block 13D in X direction or the respective areas of the first sub-block 13A, the second sub-block 13B, the third sub-block 13C, and the fourth sub-block 13D can be regarded as substantially equal to each other even when the lengths and the areas include an error of about ±10%. When it is herein described that the lengths, areas, and the like are substantially equal to each other, this means that the lengths, areas, and the like include an error of about ±10%.

As shown in FIG. 3, grating grooves 12a are periodically provided along X direction in the first region 12A, the second region 12B, and the third region 12C. The phase of the periodic structure of the grating grooves 12a is different in the first region 12A, the second region 12B, and the third region 12C. More specifically, the first region 12A and the third region 12C have a phase difference of 180 degrees and the first region 12A and each sub-block of the second region 12B have a phase difference of 90 degrees.

In the second region 12B, the sub-blocks located diagonally opposite to each other have the same phase, and the sub-blocks located adjacent to each other in X direction and Y direction have different phases. In other words, the first sub-block 13A and the fourth sub-block 13D have the same phase and the second sub-block 13B and the third sub-block 13C have the same phase. The first sub-block 13A and the fourth sub-block 13D have a different phase from that of the second sub-block 13B and the third sub-block 13C.

More specifically, in the second region 12B, the periodic structure in the first sub-block 13A and the fourth sub-block 13D has a phase difference of substantially 180 degrees from the periodic structure in the second sub-block 13B and the third sub-block 13C. In other words, the arrangement of the grating grooves 12a in the second sub-block 13B and the third sub-block 13C is shifted by half a pitch of the grating grooves 12a in the first sub-block 13A and the fourth sub-block 13D in Y direction from the arrangement of the grating grooves 12a in the first sub-block 13A and the fourth sub-block 13D.

The phase of the periodic structure in the first region 12A is ahead of that of the periodic structure in the first sub-block 13A and the fourth sub-block 13D by substantially 90 degrees (shifted by substantially +90 degrees), and is behind that of the periodic structure in the second sub-block 13B and the third sub-block 13C by substantially 90 degrees (shifted by substantially −90 degrees). In other words, the arrangement of the grating grooves 12a in the first region 12A is shifted by one fourth of a pitch of the grating grooves 12a in the first sub-block 13A and the fourth sub-block 13D in +Y direction from the arrangement of the grating grooves 12a in the first sub-block 13A and the fourth sub-block 13D. Moreover, the arrangement of the grating grooves 12a in the first region 12A is shifted by one fourth of a pitch of the grating grooves 12a in the second sub-block 13B and the third sub-block 13D in −Y direction from the arrangement of the grating grooves 12a in the second sub-block 13B and the third sub-block 13D.

The periodic structure in the third region 12C has a phase difference of substantially 180 degrees from the periodic structure in the first region 12A. Accordingly, the phase of the periodic structure in the third region 12C is behind that of the periodic structure in the first sub-block 13A and the fourth sub-block 13D by substantially 90 degrees, and is ahead of that of the periodic structure in the second sub-block 13B and the third sub-block 13C by substantially 90 degrees. In other words, the arrangement of the grating grooves 12a in the third region 12C is shifted by one fourth of the pitch of the grating grooves 12a in the first sub-block 13A and the fourth sub-block 13D in −Y direction from the arrangement of the grating grooves 12a in the first sub-block 13A and the fourth sub-block 13D. Moreover, the arrangement of the grating grooves 12a in the third region 12C is shifted by one fourth of the pitch of the grating grooves 12a in the second sub-block 13B and the third sub-block 13D in +Y direction from the arrangement of the grating grooves 12a in the second sub-block 13B and the third sub-block 13D.

It is only required that the phase in the first region 12A is shifted by substantially 90 degrees from the phase in the first sub-block 13A and the fourth sub-block 13D and from the phase in the second sub-block 13B and the third sub-block 13C. Accordingly, the phase in the first region 12A may be behind that in the first sub-block 13A and the fourth sub-block 13D by substantially 90 degrees and may be ahead of that in the second sub-block 13B and the third sub-block 13C by substantially 90 degrees.

The phase of the periodic structure in each region does not have to be shifted exactly by 90 degrees or 180 degrees. Since the convergence spots on the recording surface of the optical information recording medium 51 need only have such a shape as described below, the phase shift may include an error of about ±10 degrees.

As shown in FIG. 3, the center (the center of a light emitting point) L1 of the light beam 31 emitted from the light source 11 is preferably positioned on the intersection of the third dividing line D3 and the fourth dividing line D4 within the range of assembly accuracy of the device.

Hereinafter, the reason why the optical pickup device of the first embodiment is able to stably detect tracking errors on optical information recording media having different guide groove pitches will be described.

Figure 4:
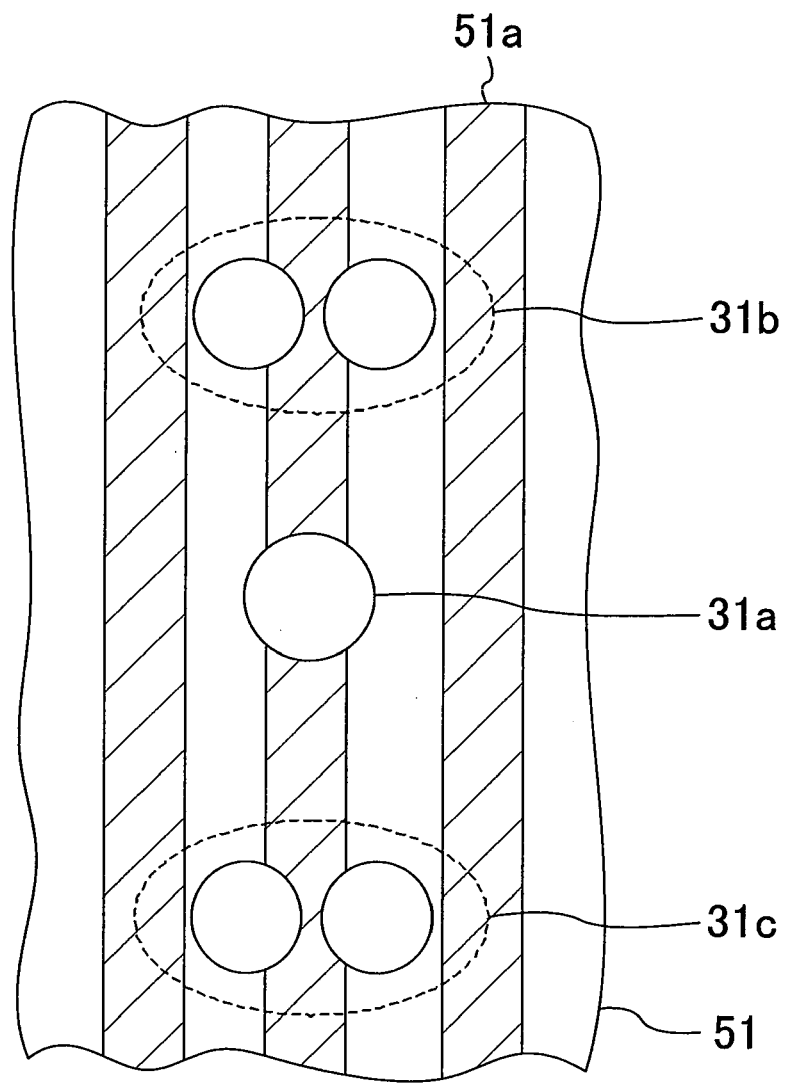
FIG. 4 is a plan view showing the shapes of convergence spots formed on a recording surface of an optical information recording medium by the optical pickup device according to the first embodiment of the invention.

FIG. 4 shows the shapes of respective convergence spots of the main beam 31a and the two sub-beams 31b and 31c of the emitted light beam generated by the diffraction grating 12 on the recording surface of the optical information recording medium 51. In FIG. 4, X direction shows the radius direction of the optical information recording medium and Y direction shows the extending direction of the guide grooves.

The emitted light beam 31 incident on the diffraction grating 12 is separated into a main beam and sub-beams having a prescribed phase difference by the respective periodic structures formed in the first region 12A, the second region 12B, and the third region 12C, and the separated sub-beams are then guided to the optical information recording medium 51.

In the second region 12B of the diffraction grating 12, the diffraction grating in the first sub-block 13A and the fourth sub-block 13D has a phase difference of 180 degrees from the diffraction grating in the second sub-block 13B and the third sub-block 13C. Therefore, diffracted light that has passed through the first sub-block 13A and the fourth sub-block 13D and diffracted light that has passed through the second sub-block 13B and the third sub-block 13C cancel each other, and the respective convergence spots of the sub-beams 31b and 31c on the recording surface of the optical information recording medium 51 in FIG. 4 have lower intensity in their centers. In this case, it is only necessary that the respective convergence spots of the sub-beams 31b and 31c have lower intensity in their centers, and the phase difference between the first and fourth sub-blocks 13A, 13D and the second and third sub-blocks 13B, 13C may include an error of about ±10 degrees from 180 degrees.

The phase of the diffraction grating in the first region 12A is ahead of that in the first sub-block 13A and the fourth sub-block 13D in the second region 12B by 90 degrees and is behind that in the second sub-block 13B and the third sub-block 13C in the second region 12B by 90 degrees. The phase of the diffraction grating in the third region 12C is ahead of that in the second sub-block 13B and the third sub-block 13C by 90 degrees and is behind that in the first sub-block 13A and the fourth sub-block 13D by 90 degrees. Accordingly, the phase of the $+1^{st}$ order diffracted beam that has passed through the first region 12A is advanced by 90 degrees from that of the +1$^{st}$ order diffracted beam that has passed through the first sub-block 13A and the fourth sub-block 13D, and is retarded by 90 degrees from that of the +1$^{st}$ order diffracted beam that has passed through the second sub-block 13B and the third sub-block 13C.

On the other hand, the phase of the +1$^{st}$ order diffracted beam that has passed through the third region 12C is advanced by 90 degrees from that of the +1$^{st}$ order diffracted beam that has passed through the second sub-block 13B and the third sub-block 13C, and is retarded by 90 degrees from that of the +1$^{st}$ order diffracted beam that has passed through the first sub-block 13A and the fourth sub-block 13D. An opposite phenomenon occurs for the −1$^{st}$ order diffracted beam.

Since light whose phase is advanced by 90 degrees and light whose phase is retarded by 90 degrees are equally present on the left and right sides of the convergence spot with respect to Y direction, the intensity distribution of the convergence spot becomes left-right symmetric with respect to Y direction. In this case as well, the phase difference between the first region 12A and the second region 12B and the phase difference between the second region 12B and the third region 12C may include an error of about ±10 degrees from 90 degrees.

As shown in FIG. 4, a plurality of guide grooves 51a are periodically formed on the recording surface of the optical information recording medium 51. The respective convergence spots of the main beam 31a, the sub-beam 31b, and the sub-beam 31c of the emitted light beam converged by the objective lens 19 are located on the same guide groove 51a, as shown in FIG. 4.

The main beam 31a, the sub beam 31b, and the sub beam 31c are reflected at the respective convergence spots, and reflected light beams corresponding to the respective convergence spots are respectively received by the light receiving elements 21A, 21B, and 21C provided in the photodetector 16. The light receiving elements 21A, 21B, and 21C output a push-pull signal MPP corresponding to the main beam 31a, a push-pull signal SPP1 corresponding to the sub-beam 31b, and a push-pull signal SPP2 corresponding to the sub-beam 31c, respectively.

Offset components of the push-pull signals MPP, SPP1, and SPP2 resulting from a radial shift (a shift in the radius direction of the optical information recording medium) of the objective lens 19 and a tilt of the optical information recording medium 51 are generated on the same side (the same phase) for the radial shift of the objective lens 19 or the tilt of the optical information recording medium 51. Accordingly, a differential push-pull (DPP) signal obtained by cancelling the offsets resulting from the radial shift of the objective lens 19 and the tilt of the optical information recording medium 51 can be detected by performing an arithmetic operation shown by the following formula (1) by using the adder 27, the amplifier 28, and the subtracter 29 shown in FIG. 2:

$$DPP=MPP-k\times(SPP1+SPP2) \quad (1)$$

where k is an amplification factor of the amplifier 28.

Figure 5:
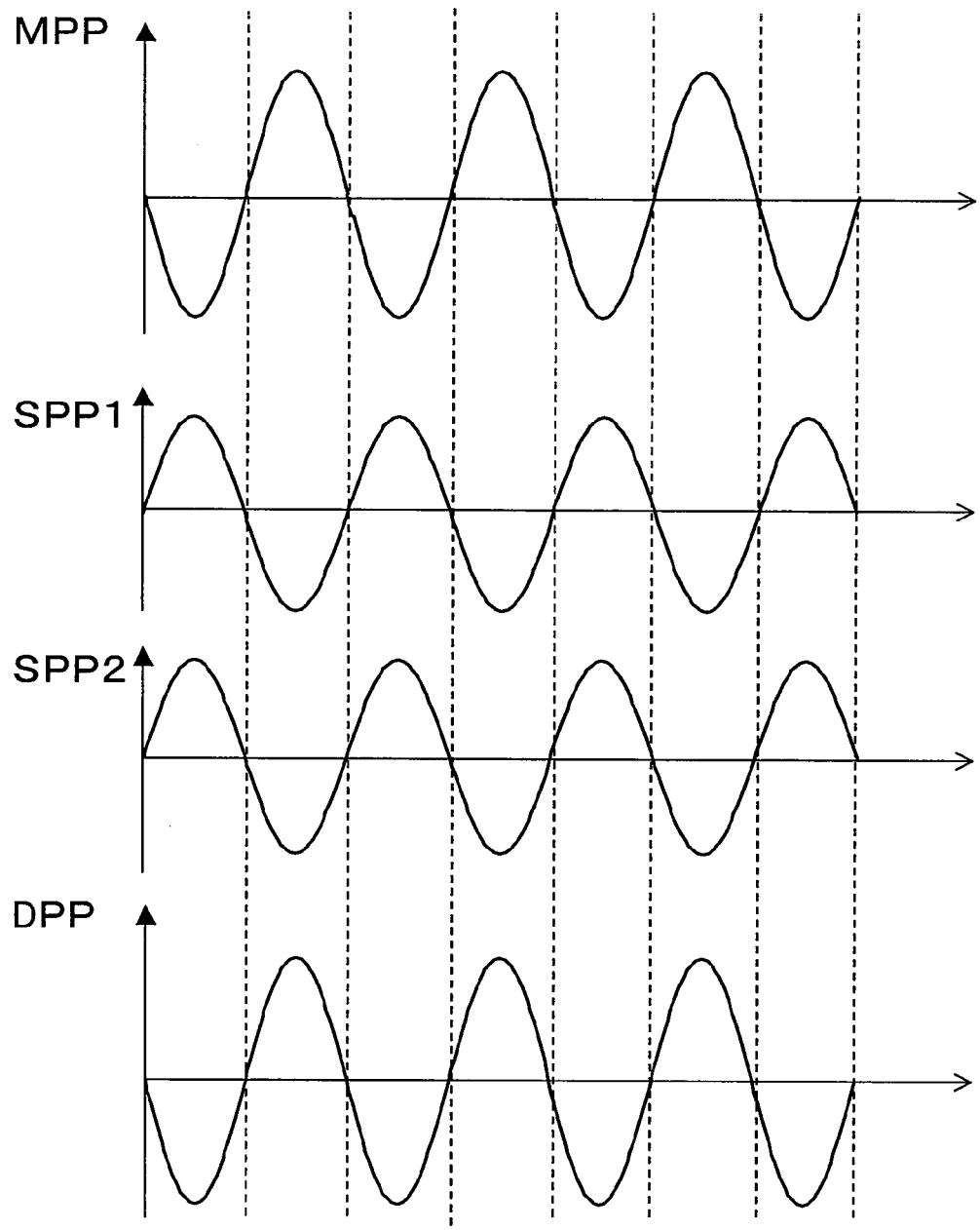
FIG. 5 is a waveform diagram of signals obtained by the optical pickup device according to the first embodiment of the invention.

FIG. 5 shows respective output waveforms of the push-pull signals MPP, SPP1, and SPP2 and the DPP signal obtained by the above formula (1). In FIG. 5, the ordinate indicates signal strength and the abscissa indicates a relative position of the convergence spot on the optical information recording medium 51. As shown in FIG. 5, SPP1 and SPP2 have a phase difference of exactly 180 degrees from MPP. Since the DPP signal obtained by the above formula (1) has a proper value, each convergence spot can be formed on the same guide groove.

As shown in FIG. 2, the inputs of the adder 27 are respectively connected to the respective outputs of the subtracters 25 and 26, and the input of the amplifier 28 is connected to the output of the adder 27. The inputs of the subtracter 29 are respectively connected to the output of the subtracter 24 and the output of the amplifier 28. The arithmetic operation shown by the above formula (1) can be performed with this structure. The coefficient k in the formula (1) is used to correct the difference in light intensity among the main beam 31a, the sub-beam 31b, and the sub-beam 31c that are reflected from the optical information recording medium 51. When the light intensity ratio of the main beam 31a, the sub-beam 31c, and the sub-beam 31c is a:b:b, the coefficient k is a/2b. In other words, the coefficient k is a constant that is determined according to the optical information recording medium 51. A conventional structure may be used as a signal processing circuit.

Figure 6:
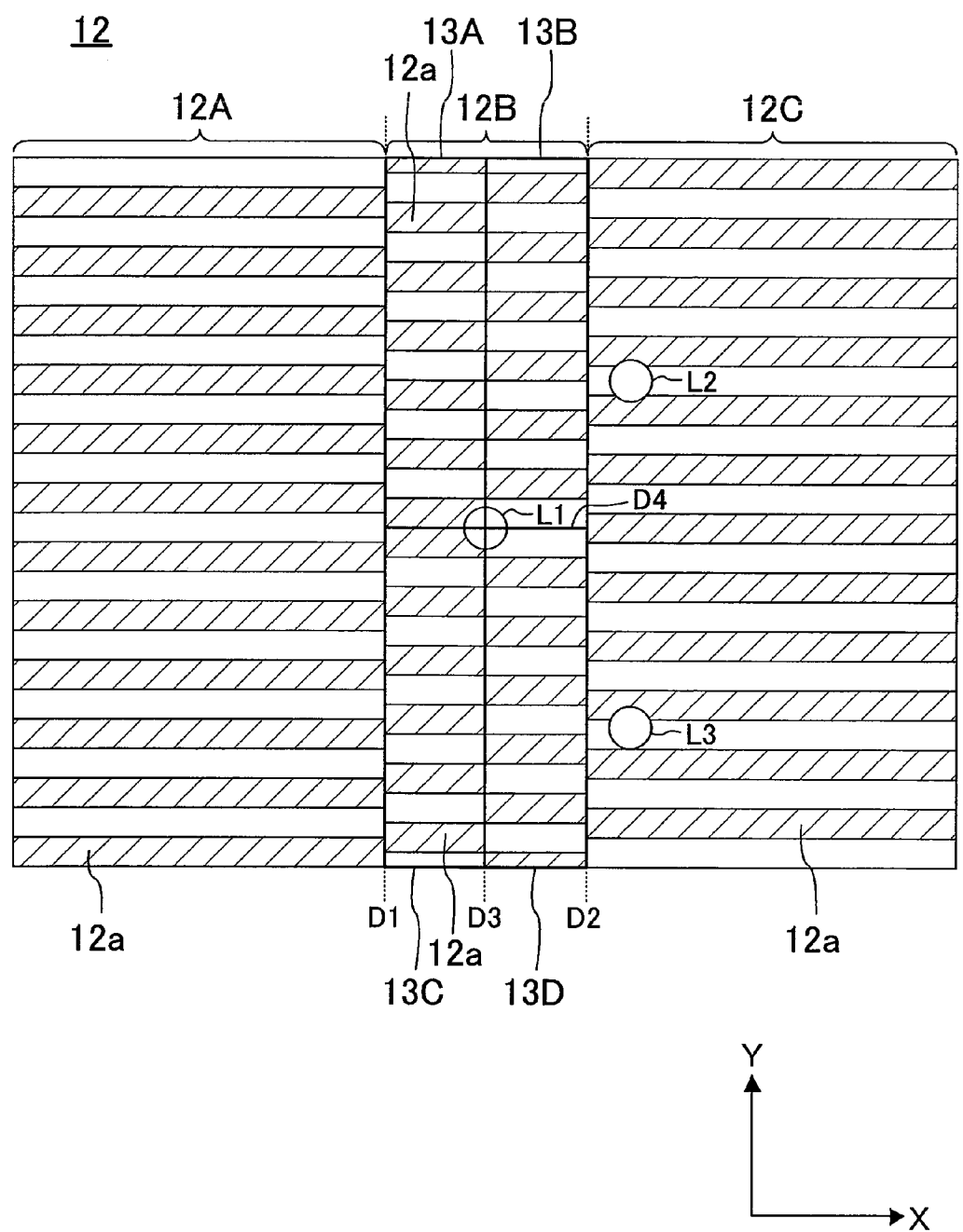
FIG. 6 is a plan view showing an example of a positional relation between the diffraction grating of the optical pickup device according to the first embodiment of the invention and the respective centers of light beams.

The structure shown in this embodiment has one light source. However, there may be a plurality of light sources. In this case, it is preferable that the center of a light beam emitted from at least one of the plurality of light sources is positioned on the intersection of the third dividing line D3 and the fourth dividing line D4 as shown in FIG. 6.

Figure 7:
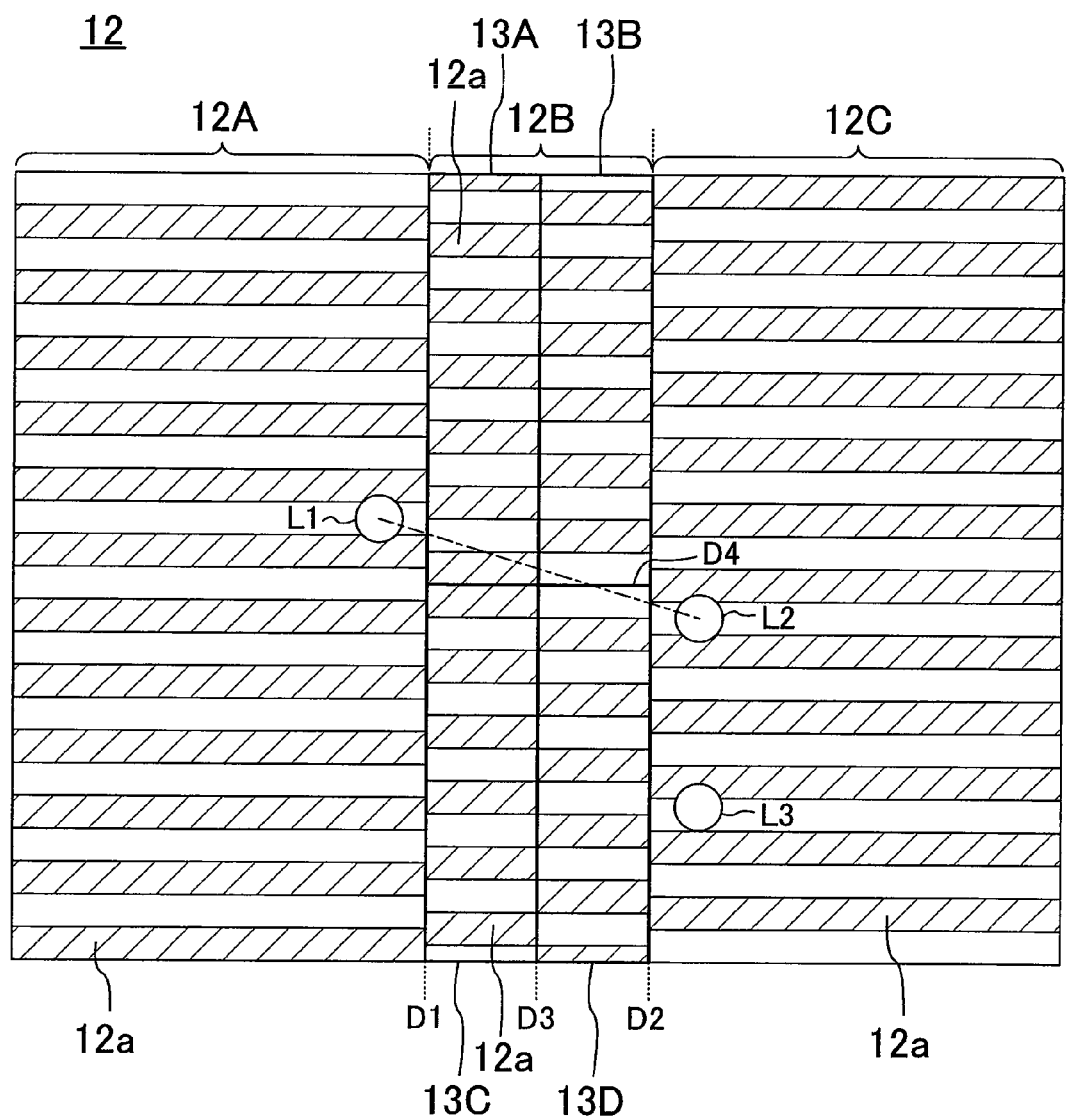
FIG. 7 is a plan view showing an example of a positional relation between the diffraction grating of the optical pickup device according to the first embodiment of the invention and the respective centers of light beams.

As shown in FIG. 7, the center of a light beam L1 emitted from a first light source of the plurality of light sources and the center of a light beam L2 emitted from a second light source may be positioned so that a straight line connecting the center of the light beam L1 and the center of the light beam L2 crosses the third dividing line D3. In this case, the position of the center L3 of a light beam emitted from a third light source is not particularly limited. The third light source need not necessarily be provided.

There is one third dividing line in this embodiment. However, the first sub-block 13A and the third sub-block 13C may have different widths in X direction and two separate third dividing lines may be provided: a third dividing line for separating the first sub-block 13A and the second sub-block 13B from each other; and a third dividing line for separating the third sub-block 13C and the fourth sub-block 13D. Moreover, the first sub-block 13A and the second sub-block 13B may have different lengths in Y direction and two separate fourth dividing lines may be provided: a fourth dividing line for separating the first sub-block 13A and the third sub-block 13C from each other; and a fourth dividing line for separating the second sub-block 13B and the fourth sub-block 13D from each other.

Second Embodiment

Figure 8:
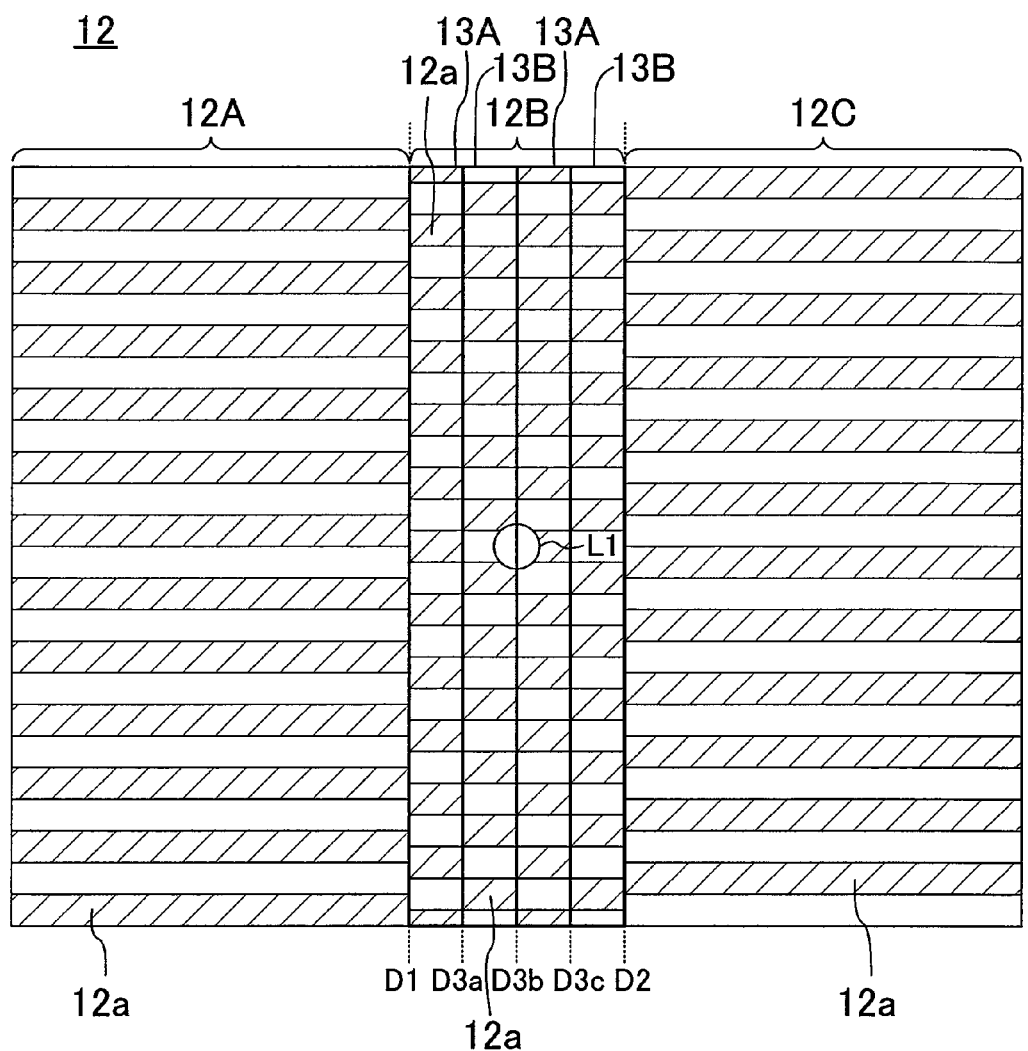
FIG. 8 is a plan view of a diffraction grating of an optical pickup device according to a second embodiment of the invention.

Hereinafter, a second embodiment of the invention will be described with reference to the figures. FIG. 8 shows a diffraction grating 12 used in an optical pickup device of the second embodiment. In FIG. 8, the same elements as those in FIG. 3 are denoted by the same reference numerals and characters and description thereof will be omitted.

As shown in FIG. 8, a grating surface of the diffraction grating 12 of this embodiment is divided into three regions having different phases by a first dividing line D1 and a second dividing line D2 that extend in Y direction: a first region 12A, a second region 12B, and a third region 12C. In other words, the first region 12A and the second region 12B are adjacent to each other with the first dividing line D1 interposed therebetween, and the second region 12B and the third region 12C are adjacent to each other with the second dividing line D2 interposed therebetween.

The second region 12B includes a first sub-block 13A and a second sub-block 13B that are separated from each other by a third dividing line extending in Y direction. The first sub-block 13A and the second sub-block 13B have a phase difference of substantially 180 degrees and are alternately arranged from the side of the first region 12A. The phase of the first region 12A is ahead of that of the first sub-block 13A by substantially 90 degrees and is behind that of the second sub-block 13B by substantially 90 degrees. On the other hand, the first region 12A and the third region 12C have a phase difference of substantially 180 degrees. Accordingly, the phase of the third region 12C is behind that of the first sub-block 13A by substantially 90 degrees and is ahead of that of the second sub-block 13B by substantially 90 degrees.

Note that it is only necessary that the first region 12A has a phase difference of substantially 90 degrees from the first sub-block 13A and the second sub-block 13B. Accordingly, the phase of the first region 12A may be behind that of the first sub-block 13A by substantially 90 degrees and may be ahead of that of the second sub-block 13B by substantially 90 degrees.

With this structure, the difference between the total area of the emitted light beam 31 passing through the first sub-blocks 13A and the total area of the emitted light beam 31 passing through the second sub-blocks 13B, that is, the difference between the total light quantity of the emitted light beam 31 passing through the first sub-blocks 13A and the total light quantity of the emitted light beam 31 passing through the second sub-blocks 13B, can be suppressed. Accordingly, excellent properties can be obtained regardless of the position of the diffraction grating 12 in Y direction, that is, the position of the center of the light beam emitted from the light source 11.

FIG. 8 shows an example in which third dividing lines D3a, D3b, and D3c are provided and two first sub-blocks 13A and two second sub-blocks 13B are provided. However, it is only necessary that at least two first sub-blocks 13A and at least one second sub-block 13B are provided. It is preferable that the number of first sub-blocks 13A is equal to the number of second sub-blocks 13B because the total area of light passing through the first sub-blocks 13A becomes equal to the total area of light passing through the second sub-blocks 13B and a symmetric property is improved.

In FIG. 8, the first sub-block 13A and the second sub-block 13B have substantially the same length in X direction. However, the first sub-block 13A and the second sub-block 13B may have different lengths in X direction. It is preferable that the sum of the lengths of the first sub-blocks 13A in X direction is substantially equal to the sum of the lengths of the second sub-blocks 13B in X direction.

FIG. 8 shows an example in which the center L1 of the light beam 31 emitted from the light source 11 is positioned on the third dividing line D3b. However, the invention is not limited to this, and the center of the light beam 31 emitted from the light source 11 need only be positioned in the second region 12B.

Figure 9:
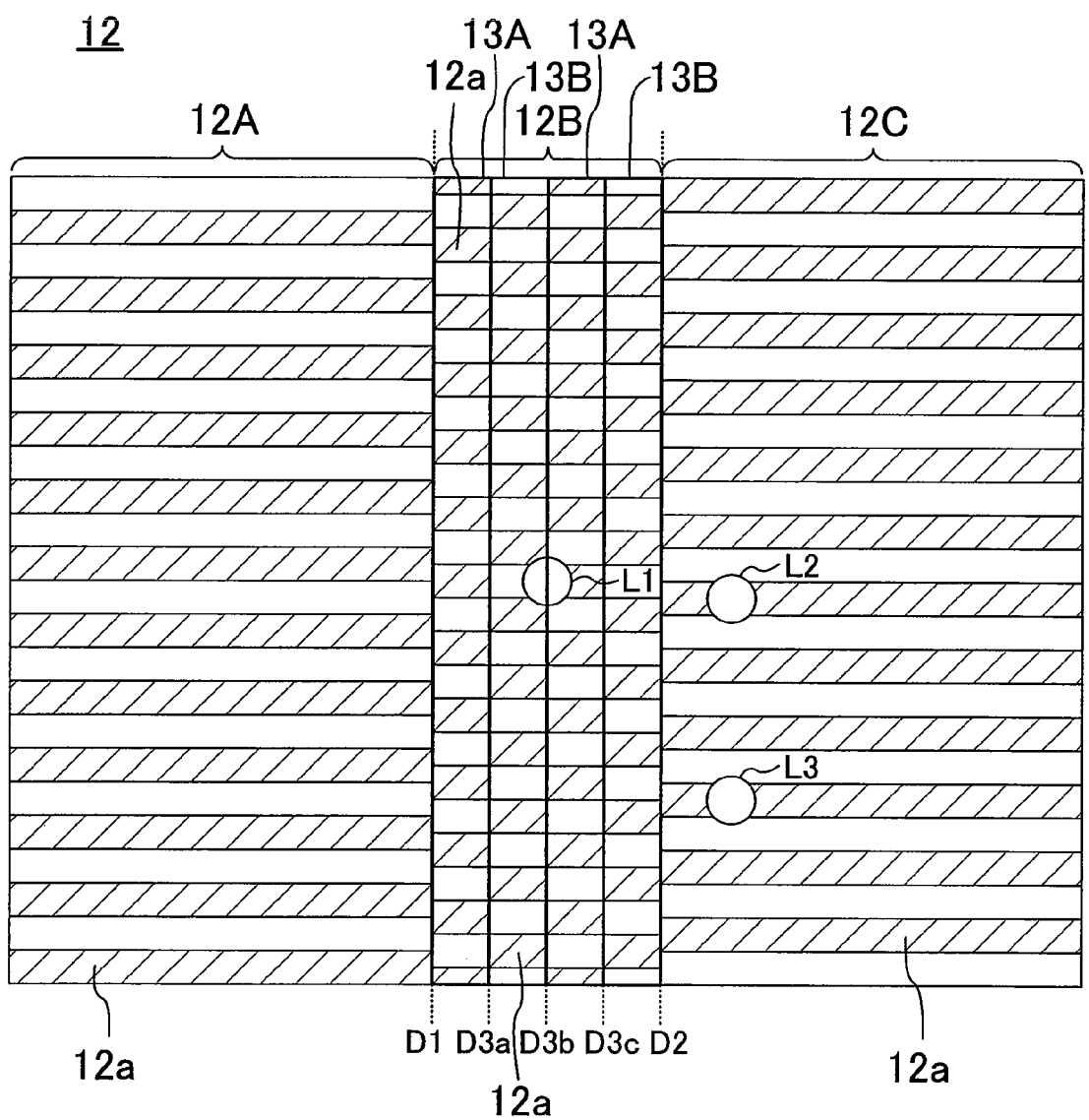
FIG. 9 is a plan view showing an example of a positional relation between the diffraction grating of the optical pickup device according to the second embodiment of the invention and the respective centers of light beams.

There is one light source in the second embodiment. However, there may be a plurality of light sources. In this case, as shown in FIG. 9, it is preferable that the center of a light beam emitted from at least one of the plurality of light sources is positioned in the second region 12B.

Figure 10:
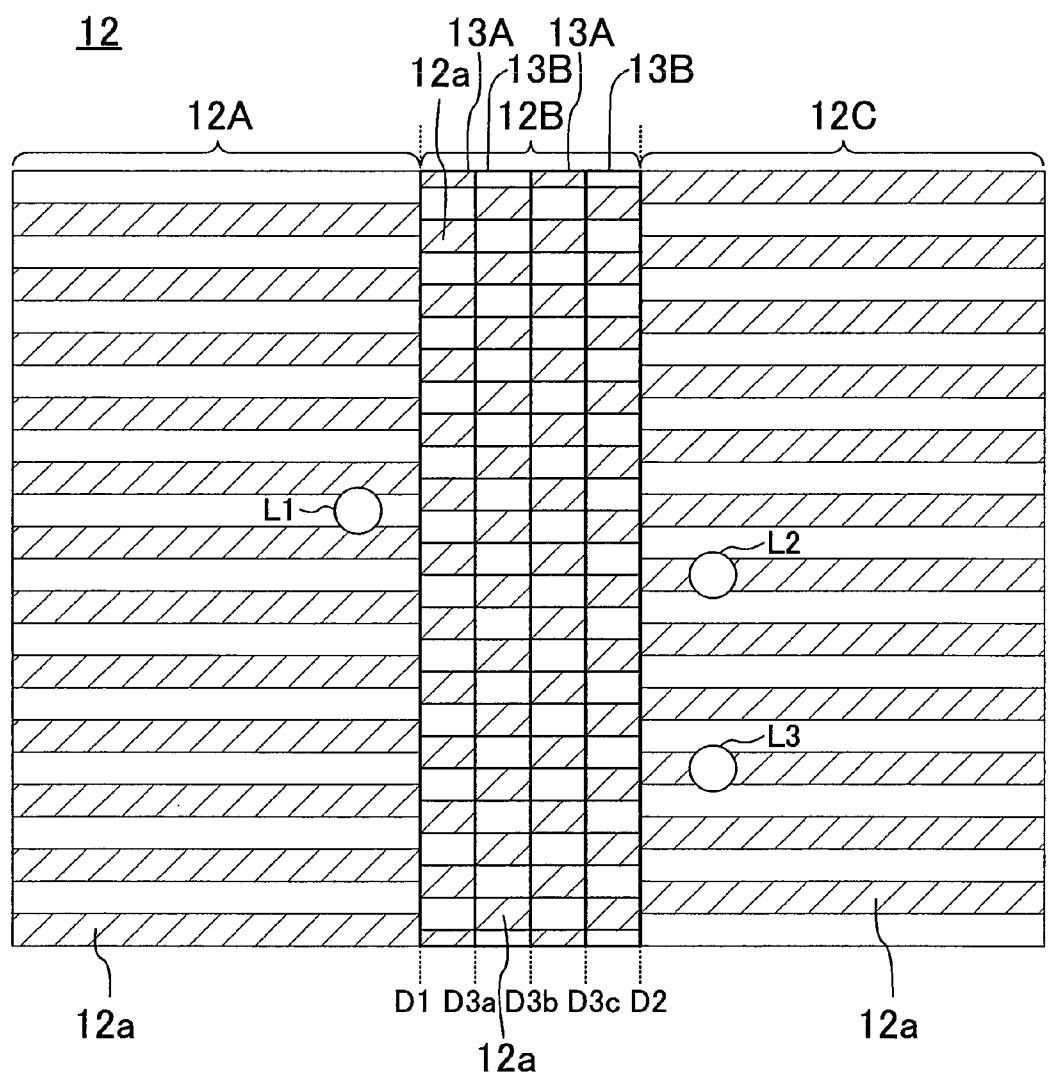
FIG. 10 is a plan view showing an example of a positional relation between the diffraction grating of the optical pickup device according to the second embodiment of the invention and the respective centers of light beams.
Figure 11:
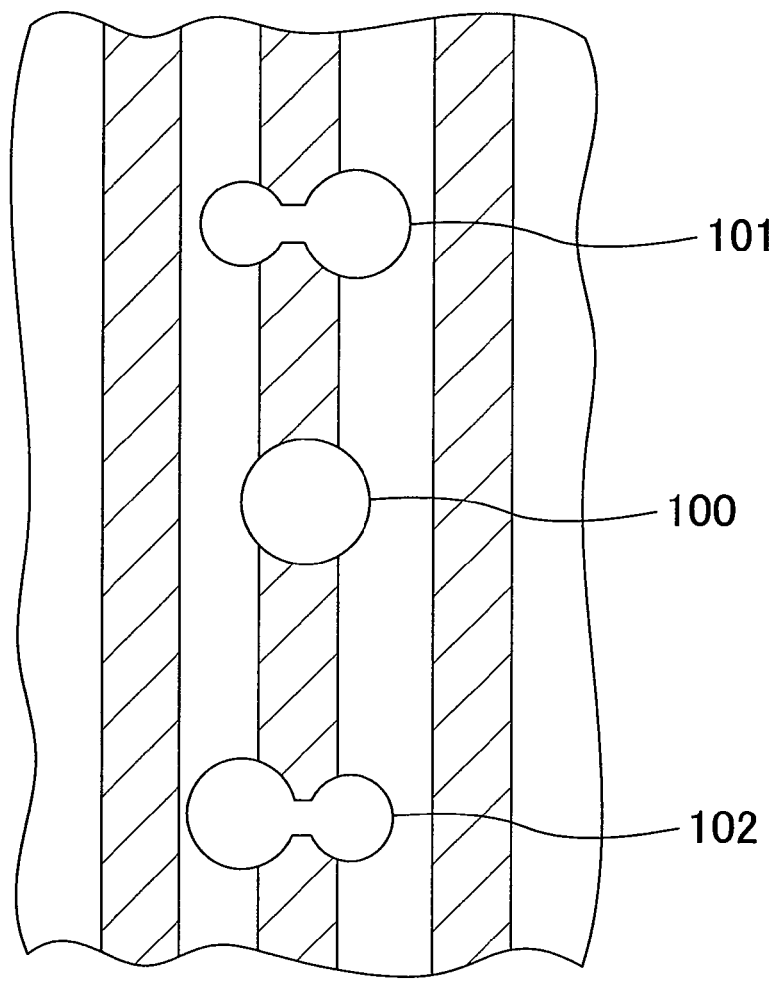
FIG. 11 is a plan view showing the shapes of convergence spots formed on a recording surface of an optical information recording medium by a conventional optical pickup device.
Figure 12:
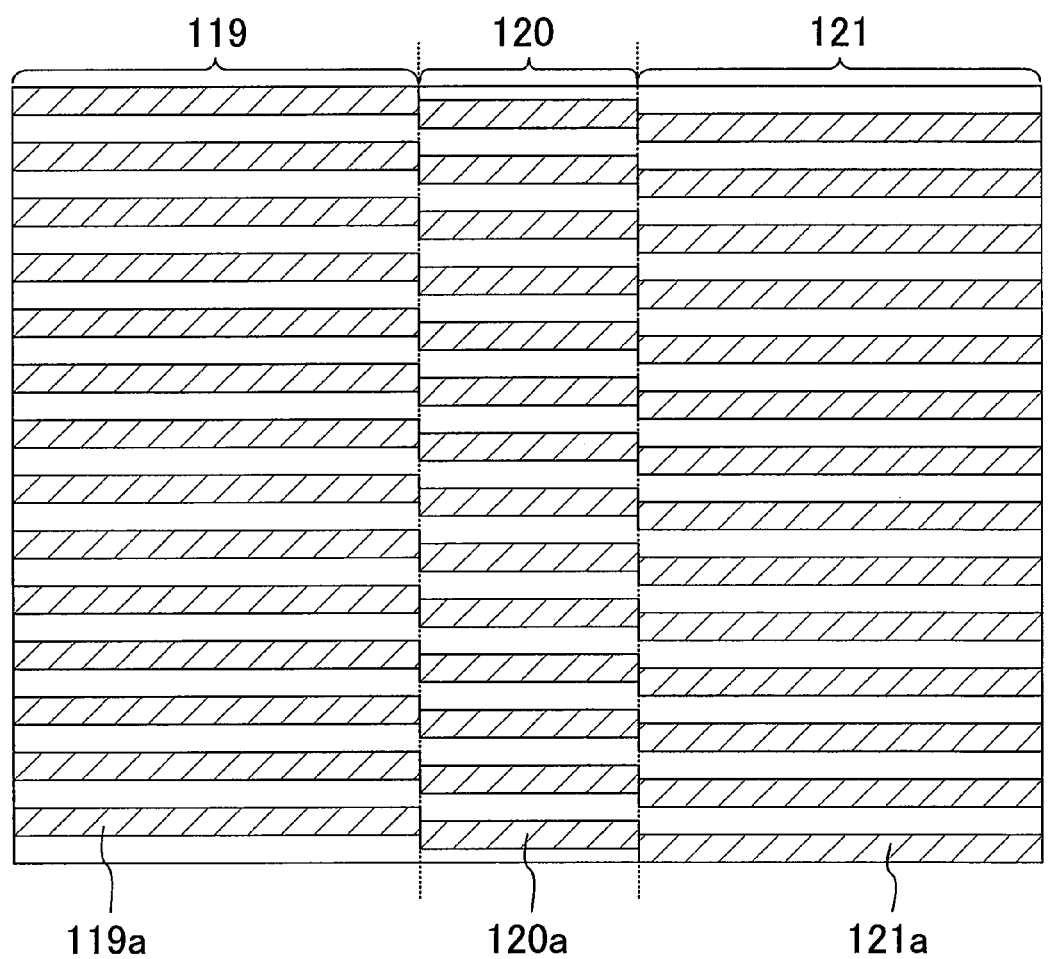
FIG. 12 is a plan view of a diffraction grating of the conventional optical pickup device.

As shown in FIG. 10, the center L1 of a light beam emitted from a first light source of the plurality of light sources may be positioned in the first region 12A and the center L2 of a light beam emitted from a second light source may be positioned in the third region 12C. In this case, the position of the center L3 of a light beam emitted from a third light source is not particularly limited. The third light source need not necessarily be provided.

In the first and second embodiments, the type of the optical information recording medium 51 is not particularly limited, and DVDs including a DVD-ROM, a DVD-RAM, a DVD-R, and a DVD-RW and CDs including a CD-ROM, a CD-R, and a CD-RW may be used as the optical information recording medium 51. The wavelength of the emitted light beam 31 is determined according to the optical information recording medium 51, and is in the range of about 650 nm to about 780 nm in the case of a DVD and a CD. For DVDs, stable tracking error signal detection can be performed on a DVD having a guide groove pitch of 0.74 µm such as a DVD-R and a DVD having a guide groove pitch of 1.23 µm such as a DVD-RAM.

In each of the above embodiments, the diffraction grating 12 is placed between the light source 11 and the half mirror 15 in the optical system shown in FIG. 1. However, the diffraction grating 12 may alternatively be placed, for example, between the half mirror 15 and the collimating lens 18. Instead of the optical system of FIG. 1, an optical system in which a light source and a photodetector are integrated (for example, an optical system that does not use a half mirror) may be used and the diffraction grating may be placed between the light source and the collimating lens.

In each of the above embodiments, the grating grooves in each region of the diffraction grating 12 are formed along X direction, that is, the radius direction of the optical information recording medium. However, the grating grooves may alternatively be formed in a direction oblique to X direction.

As has been described above, the optical pickup device of each embodiment can be used for various optical information recording media having different guide groove pitches and achieves tracking error signal detection that enables more stable recording and playback. In other words, the optical pickup device of each embodiment can implement size reduction, simplification, cost reduction, higher efficiency, and the like in DVD- and CD-type recording devices and playback devices. Moreover, the optical pickup device of each embodiment is very useful as an optical pickup device having a function to detect signals such as a playback signal, a recording signal, and various servo signals which are used in an optical head device serving as a main part of an optical information processor for performing processing, such as recording, playback, and erasure of information, on an optical information recording medium such as an optical disc.

INDUSTRIAL APPLICABILITY

The invention can implement an optical pickup device for performing stable tracking error detection on a plurality of optical information recording media having different guide groove pitches while maintaining the advantages of the in-line DPP method. The optical pickup device of the invention is useful as devices such as an optical pickup device that is used in an optical information processor for performing processing such as recording of information onto an optical information recording medium and playback or erasure of information recorded on an optical information recording medium.

What is claimed is:
1. An optical pickup device for recording information onto an optical information recording medium and reading and erasing information recorded on the optical information recording medium, comprising:
 a light source;
 a diffraction grating for separating a light beam emitted from the light source into at least three light beams; and a photodetector for receiving the separated light beams reflected from the optical information recording medium, wherein the diffraction grating is divided into a first region, a second region, and a third region having periodic structures with different phases by a first dividing line and a second dividing line that extend in a first direction parallel to a tangential direction of a track of the optical information recording medium, the second region is located between the first region and the third region and is divided into a first sub-block, a second sub-block, a third sub-block, and a fourth sub-block by a third dividing line extending in the first direction and a fourth dividing line extending in a second direction that crosses the first direction, the first sub-block and the second sub-block are located adjacent to each other in the second direction, and the third sub-block and the fourth sub-block are located adjacent to each other in the second direction, the first sub-block and the third sub-block are located adjacent to each other in the first direction, and the second sub-block and the fourth sub-block are located adjacent to each other in the first direction, the respective periodic structures of the first sub-block and the fourth sub-block have a same phase and the respective periodic structures of the second sub-block and the third sub-block have a same phase, the periodic structures of the first sub-block and the fourth sub-block have a phase difference of approximately 180 degrees from the periodic structures of the second sub-block and the third sub-block, the periodic structure of the first region has a phase difference of approximately 90 degrees from the periodic structure of each sub-block of the second region, and the periodic structure of the first region has a phase difference of approximately 180 degrees from the periodic structure of the third region.

2. The optical pickup device according to claim 1, wherein a gap between the first dividing line and the third dividing line is substantially equal to a gap between the second dividing line and the third dividing line.

3. The optical pickup device according to claim 1, wherein the first sub-block, the second sub-block, the third sub-block, and the fourth sub-block have a substantially same area.

4. The optical pickup device according to claim 1, wherein a center of the light beam emitted from the light source is positioned at an intersection of the third dividing line and the fourth dividing line in the diffraction grating.

5. The optical pickup device according to claim 1, wherein the light source includes a plurality of light sources, and a center of a light beam emitted from at least one of the plurality of light sources is positioned at an intersection of the third dividing line and the fourth dividing line in the diffraction grating.

6. The optical pickup device according to claim 1, wherein the light source includes a first light source and a second light source, and a straight line connecting a center of a light beam emitted from the first light source and a center of a light beam emitted from the second light beam crosses the third dividing line.

7. An optical pickup device for recording information onto an optical information recording medium and reading and erasing information recorded on the optical information recording medium, comprising:
a light source;
a diffraction grating for separating a light beam emitted from the light source into at least three light beams; and
a photodetector for receiving the separated light beams reflected from the optical information recording medium, wherein the diffraction grating is divided into a first region, a second region, and a third region having periodic structures with different phases by a first dividing line and a second dividing line that extend in a first direction parallel to a tangential direction of a track of the optical information recording medium, the second region is located between the first region and the third region and is divided into at least two first sub-blocks and at least one second sub-block by at least two third dividing lines extending in the first direction, the first sub-block and the second sub-block are alternately arranged and the periodic structure of the first sub-block has a phase difference of approximately 180 degrees from the periodic structure of the second sub-block, the periodic structure of the first region has a phase difference of approximately 90 degrees from the periodic structure of each sub-block of the second region, and the periodic structure of the first region has a phase difference of approximately 180 degrees from the periodic structure of the third region.

8. The optical pickup device according to claim 7, wherein a length of the first sub-block in the second direction is substantially equal to a length of the second sub-block in the second direction.

9. The optical pickup device according to claim 7, wherein a number of the first sub-blocks is equal to a number of the second sub-blocks.

10. The optical pickup device according to claim 7, wherein a center of the light beam emitted from the light source is positioned in the second region of the diffraction grating.

11. The optical pickup device according to claim 7, wherein the light source includes a plurality of light sources, and a center of a light beam emitted from at least one of the plurality of light sources is positioned in the second region of the diffraction grating.

12. The optical pickup device according to claim 7, wherein the light source includes a first light source and a second light source, a center of a light beam emitted from the first light source is positioned in the first region of the diffraction grating or on the first dividing line, and a center of a light beam emitted from the second light source is positioned in the third region of the diffraction grating or on the second dividing line.

13. The optical pickup device according to claim 1, wherein the at least three light beams include a $0^{th}$ order diffracted beam, a $+1^{st}$ order diffracted beam, and a $-1^{st}$ order diffracted beam.

14. The optical pickup device according to claim 1, wherein a plurality of guide grooves are periodically formed on a recording surface of the optical information recording medium, and each of the separated light beams is converged on one of the plurality of guide grooves.

15. The optical pickup device according to claim 1, further comprising an arithmetic processing circuit for detecting a tracking error signal by a differential push-pull method based on an output signal of the photodetector.

16. The optical pickup device according to claim 1, wherein the photodetector includes at least three light receiving elements respectively corresponding to the reflected light beams, and each of the light receiving elements is divided into a plurality of light receiving regions.

* * * * *